Oct. 11, 1927.

H. D. HALLENBERG ET AL 1,645,484

ELASTIC TRAILER FOR MOTOR CARS

Filed June 11, 1925

Inventors
Harry Daniel Hallenberg
and Armas Fredrik Hynninen
By
Attorney.

Patented Oct. 11, 1927.

1,645,484

UNITED STATES PATENT OFFICE.

HARRY DANIEL HALLENBERG AND ARMAS FREDRIK HYNNINEN, OF TAMMISUO, FINLAND.

ELASTIC TRAILER FOR MOTOR CARS.

Application filed June 11, 1925, Serial No. 36,466, and in Finland June 19, 1924.

This invention relates to improvements in trailers for motor cars; and it has for its object the provision of a construction which, without any bending stresses, will allow the trailer to follow the unevennesses of the road. The hitherto-known constructions do not permit this without considerable bending stresses and, hence, they break easily on hilly roads. The present invention aims to overcome that disadvantage; and it is characterized in that all the articulations where road-irregularities tend to cause bending are effected in such manner as to allow motion without any bending stress.

The invention will now be further described with reference to the accompanying drawing, wherein.

Figure 2:
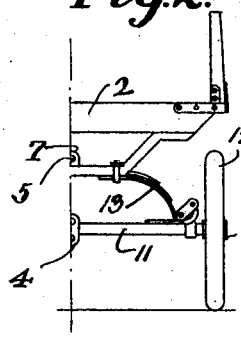
Fig. 2 is an end view of Fig. 1.
Figure 1:
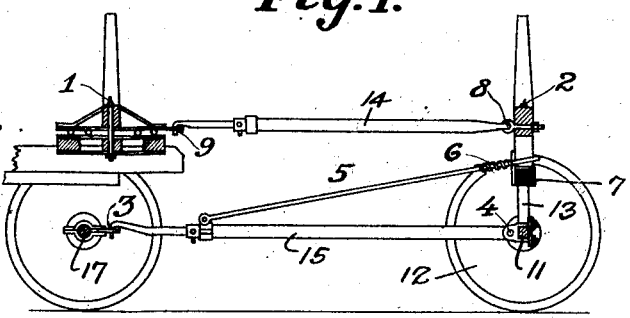
Figure 1 is a substantially-central, longitudinal sectional view of a motor car and trailer.
Figure 3:
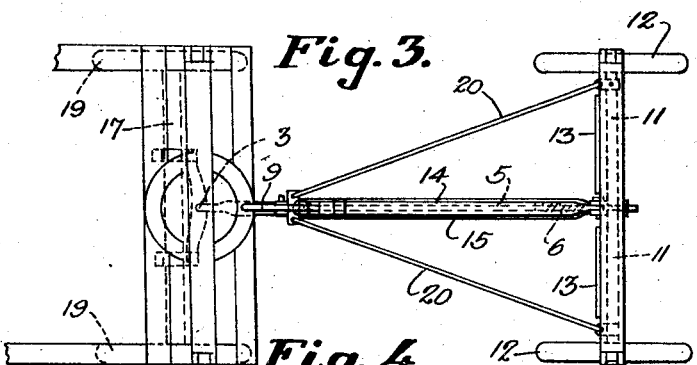
Fig. 3 is a partial top view of Fig. 1.

Referring to Fig. 1, the trailer frame is drawn by the heads 1 and 2, of which the head 1 is fastened to the motor car frame and forms one rigid piece with it, the trailer frame being turnable around this head 1. The head 2 extends across the entire width of the trailer frame and is connected to the axle 11 of the trailer wheels 12 by means of the springs 13 shown in Fig. 2. The heads 1 and 2 are kept a constant distance apart by the trailer frame; and in order to obtain a steadier connection they may also be joined together by a pole 14 which has its ends articulated to them at 9 and 8.

Figure 4:
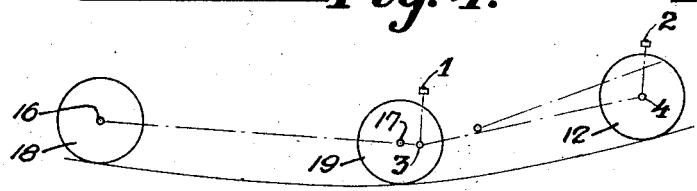
Fig. 4 is a diagram showing the position of the principal parts when the center of the trailer wheel is above the line connecting the centers of the front and back wheels of the motor car.
Figure 5:
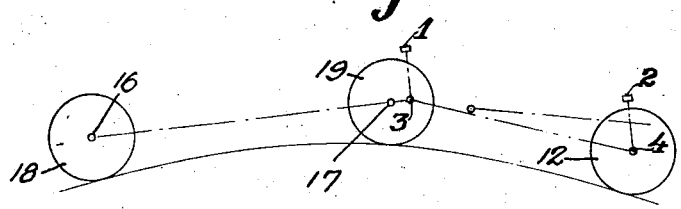
Fig. 5 is a similar diagram showing the position of the principal parts when the center of the trailer wheel is below the line connecting the centers of the front and back wheels of the motor car.

Below the pole 14 there is arranged a lower connection, comprising a reach or draw-bar 15 having its rear end jointed at 4 to the trailer axle 11 and its front end jointed at 3 to the motor car frame or chassis immediately beneath the head 1; said reach being further connected by diagonal braces 20 to the trailer axle 11. Due to this arrangement, the line 1—3 is always disposed perpendicularly to the line that connects the centers of the front and rear axles 16 and 17 of the motor car (Figs. 4 and 5); and since the trailer axle 11 is connected to joint 3 by the aforesaid reach 15 and braces 20, and the heads 1 and 2 are kept a constant distance apart, as already stated, the line 1—3 will always be parallel with the line 2—4 even if the wheels 18 and 19 of the motor car and the wheels 12 of the trailer are on different levels. Finally, in addition to the diagonal braces 20 there is employed an inclined brace rod 5, arranged in the vertical plane of the reach 15, which acts to keep the carrier frame of the trailer in an upright position when the trailer is uncoupled from the motor car. When the wheels 12 of the trailer move vertically in respect to the wheels 18 and 19 of the motor car, the end of this rod 5 will slide in the hole in the lug or projection 7, the connection of the rod 5 to the lug being permitted by means of a spring 6.

The head 1 may be arranged, as shown in Fig. 1, behind or in the rear of the vertical plane which passes through the rear axle 17 of the car, or it may be positioned in front of or directly above said axle, depending on the distribution of the load relative to the front and rear axles of the car.

We claim as our invention:

1. A trailer for tractors and other vehicles, comprising a wheeled axle; a head supported on and connected with the axle; a head fastened to the rear end of the tractor frame; a reach articulated at its rear end to said axle and detachably jointed at its front end to the rear axle of the tractor; and a pole located above and parallel with the reach and articulated at its rear end to the trailer head and detachably jointed at its front end to the tractor head, said detachable joints enabling the trailer to swing laterally and to move vertically relatively to the tractor.

2. A trailer for tractors and other vehicles, comprising a wheeled axle; a head supported on and connected with the axle; a head fastened to the rear end of the tractor frame; a reach articulated at its rear end to said axle and detachably jointed at its front end to the rear axle of the tractor; a pole located above and parallel with the reach and articulated at its rear end to the trailer head and detachbly jointed at its front end to the tractor head, said detachable joints enabling the trailer to swing laterally and to move vertically relatively to the tractor; and an inclined brace disposed above the reach in the plane thereof and articulated to said reach at its front end, the rear end of the brace having a sliding, spring-controlled connection with said trailer head.

In testimony whereof we have affixed our signatures.

HARRY DANIEL HALLENBERG.
ARMAS FREDRIK HYNNINEN.